(12) United States Patent
Voisine et al.

(10) Patent No.: US 8,721,184 B2
(45) Date of Patent: May 13, 2014

(54) SYSTEM AND METHOD FOR ASSEMBLING A SPHERICAL PLAIN BEARING

(75) Inventors: James Voisine, Burlington, CT (US); Bradley Smith, New Britain, CT (US); Charles E. Condon, III, Harwinton, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 90 days.

(21) Appl. No.: 13/297,648

(22) Filed: Nov. 16, 2011

(65) Prior Publication Data

US 2012/0128282 A1 May 24, 2012

Related U.S. Application Data

(60) Provisional application No. 61/414,150, filed on Nov. 16, 2010.

(51) Int. Cl.
*F16C 33/74* (2006.01)
*F16C 33/60* (2006.01)

(52) U.S. Cl.
USPC ............ 384/130; 384/145; 384/503; 277/917

(58) Field of Classification Search
USPC ......... 384/145, 146, 130, 138, 147, 151, 503, 384/206, 208, 209, 210, 211, 212; 277/551, 277/353, 561, 572–577
See application file for complete search history.

(56) References Cited

U.S. PATENT DOCUMENTS

| | | | |
|---|---|---|---|
| 2,380,150 A | 7/1945 | Collito | |
| 2,767,037 A | 10/1956 | Williams | |
| 3,174,811 A | 3/1965 | Schmidt et al. | |
| 3,526,940 A | 9/1970 | Beazley et al. | |
| 3,588,201 A | 6/1971 | Schmidt | |
| 3,589,779 A | 6/1971 | Sokol | |
| 3,666,331 A | 5/1972 | Curtis et al. | |
| 3,727,279 A | 4/1973 | Abel | |
| 3,834,772 A | 9/1974 | Bowen | |
| 3,848,938 A | 11/1974 | Stella et al. | |

(Continued)

FOREIGN PATENT DOCUMENTS

| GB | 1107880 | 3/1968 |
|---|---|---|
| JP | 06123315 A | 5/1994 |

(Continued)

OTHER PUBLICATIONS

PCT International Search Report and the Written Opinion of the International Searching Authority dated Feb. 21, 2012 (PCT/US2011/060971).

*Primary Examiner* — Richard W Ridley
*Assistant Examiner* — Yamilka Pinero Medina
(74) *Attorney, Agent, or Firm* — MKG, LLC

(57) ABSTRACT

A spherical plain bearing and method of assembling the same is disclosed. The bearing has an outer ring having a bore, a concave surface, and at least one fracture. The bearing further includes an inner ring having a convex surface. The convex surface is in sliding disposition with the concave surface when the inner ring is disposed in the bore. The bearing has a groove in a face of the outer ring radially outside a first opening of the bore. The bearing further includes a band coupled to a portion of the outer ring defining the groove. The band retains the outer ring around the inner ring when the inner ring is disposed in the bore.

11 Claims, 3 Drawing Sheets

(56) References Cited

U.S. PATENT DOCUMENTS

| | | | |
|---|---|---|---|
| 3,873,166 | A | 3/1975 | Berg et al. |
| 4,076,343 | A | 2/1978 | McCloskey |
| 4,109,976 | A | 8/1978 | Koch |
| 4,116,504 | A | 9/1978 | Cass |
| 4,768,889 | A | 9/1988 | Loser et al. |
| 4,819,854 | A | 4/1989 | Schmehr |
| 4,836,694 | A | 6/1989 | Schmehr et al. |
| 5,242,228 | A * | 9/1993 | Hattori .................. 384/145 |
| 5,385,352 | A | 1/1995 | Kurose |
| 5,472,284 | A * | 12/1995 | Alling et al. ............ 384/484 |
| 5,477,614 | A | 12/1995 | Watanabe |
| 5,573,336 | A | 11/1996 | Maroney |
| 5,649,772 | A * | 7/1997 | Schlereth et al. ....... 384/484 |
| 5,957,461 | A * | 9/1999 | Ulrich ..................... 277/569 |
| 6,146,471 | A | 11/2000 | Hartl et al. |
| 6,209,206 | B1 | 4/2001 | Harris et al. |
| 6,287,011 | B1 * | 9/2001 | Hartl et al. ............. 384/503 |
| 6,502,993 | B2 | 1/2003 | Sasaki et al. |
| 7,648,282 | B2 | 1/2010 | Shore et al. |
| 7,651,274 | B2 | 1/2010 | Yamamoto et al. |
| 7,891,878 | B2 | 2/2011 | Peschke et al. |
| 2002/0025091 | A1 | 2/2002 | Sasaki et al. |
| 2002/0097934 | A1 | 7/2002 | Asai et al. |
| 2002/0186904 | A1 | 12/2002 | Hartl |
| 2004/0028302 | A1 * | 2/2004 | Abels et al. ............. 384/206 |
| 2007/0269150 | A1 | 11/2007 | Guilford |
| 2008/0199113 | A1 | 8/2008 | Peschke et al. |
| 2009/0008892 | A1 | 1/2009 | Gaumer |
| 2009/0016808 | A1 | 1/2009 | Knoble et al. |
| 2010/0021094 | A1 | 1/2010 | Kaufman et al. |
| 2011/0091143 | A1 | 4/2011 | Murphy et al. |
| 2011/0142385 | A1 * | 6/2011 | Keller ..................... 384/147 |

FOREIGN PATENT DOCUMENTS

| | | |
|---|---|---|
| JP | 2006300129 A | 11/2006 |
| JP | 2008208868 A | 9/2008 |
| JP | 2011007207 A | 1/2011 |

* cited by examiner

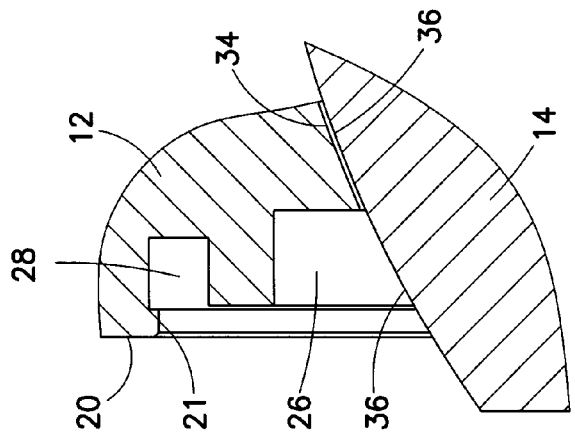
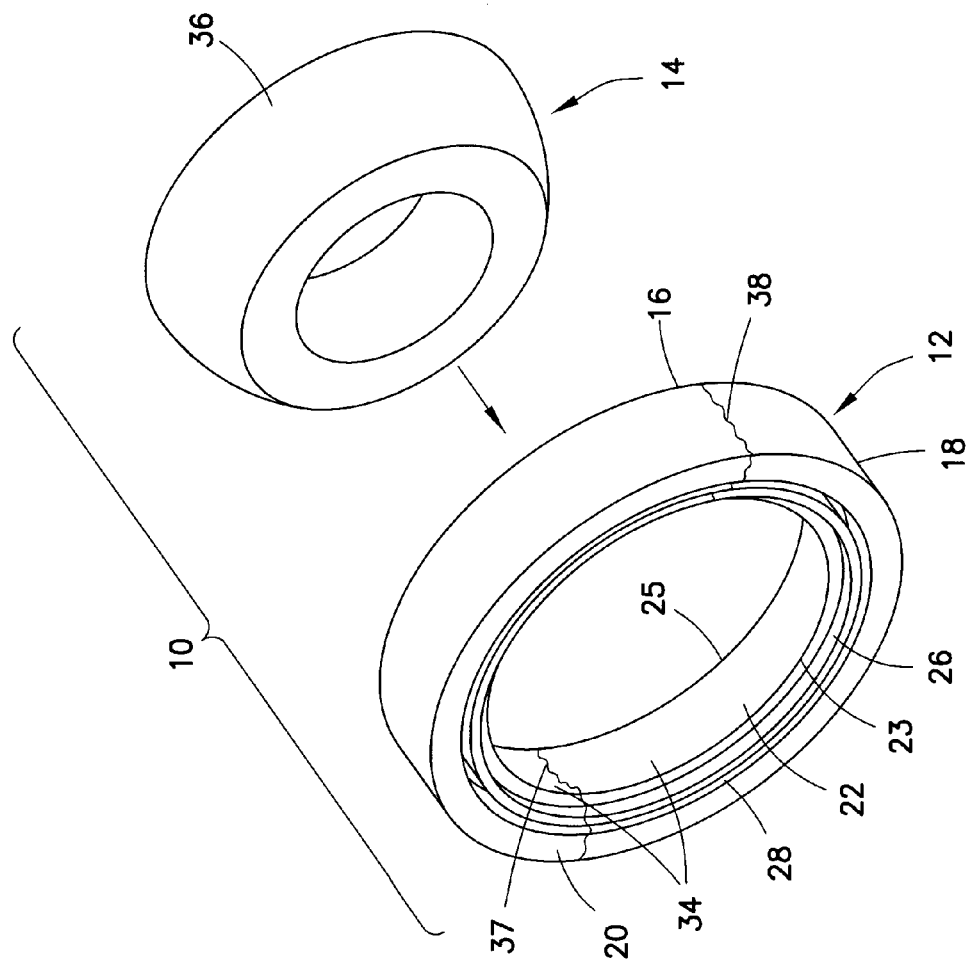

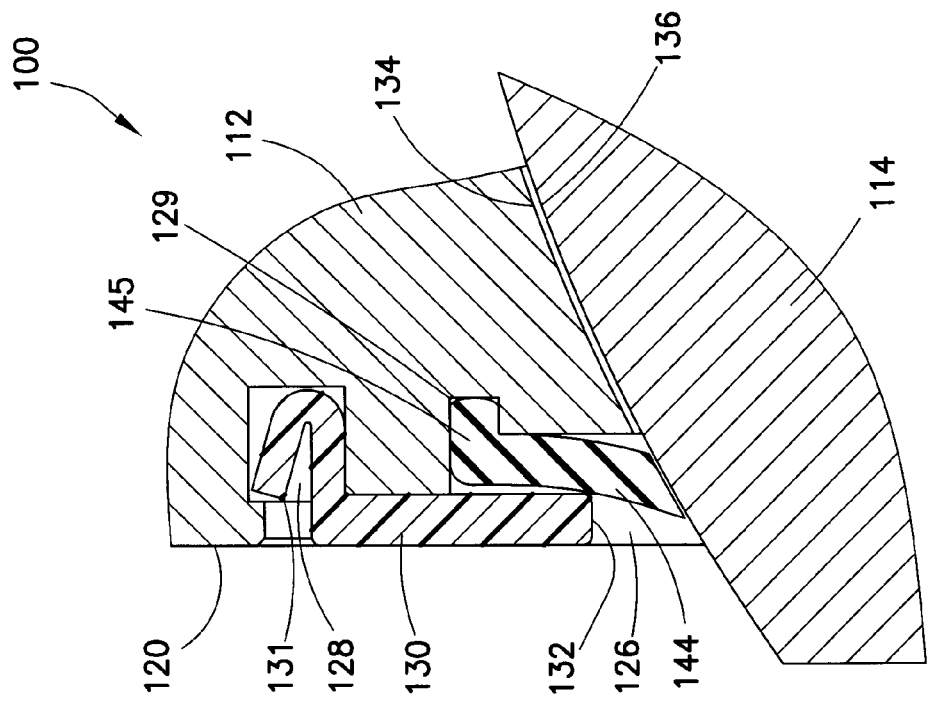
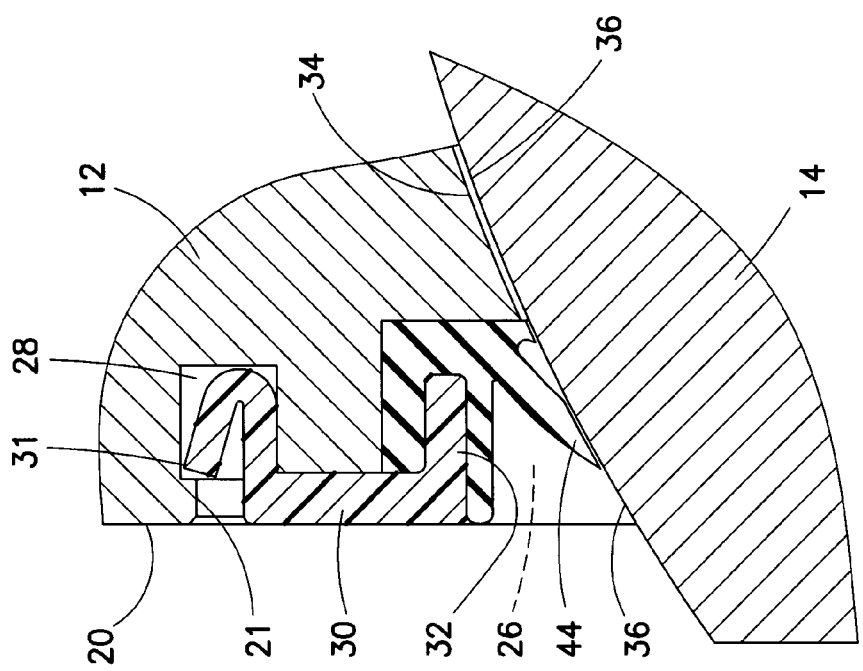
FIG. 3
FIG. 2B

SYSTEM AND METHOD FOR ASSEMBLING A SPHERICAL PLAIN BEARING

CROSS-REFERENCE TO RELATED APPLICATION

This application claims the benefit of U.S. provisional application No. 61/414,150, filed on Nov. 16, 2010, which is incorporated herein by reference in its entirety.

TECHNICAL FIELD

The present disclosure relates to spherical bearings. More particularly, the present disclosure relates to a spherical plain bearing in which a band is coupled to a portion of the bearing.

BACKGROUND

Spherical plain bearings generally have spherical contact surfaces that allow an inner ring to rotate with multiple degrees of freedom relative to an outer ring when the inner ring is disposed in a bore defined by the outer ring. This freedom facilitates a self-aligning ability of the bearing such that it can adjust to misalignment that may occur due to the application of loading forces, machining tolerances, welding distortions, or mounting distortions due to static and dynamic forces.

In some current designs, the outer ring of a bearing includes two or more sections separated by fractures that enable the outer ring to be positioned around the inner ring during assembly. This type of bearing is typically referred to as a fractured bearing. Fractured bearings are typically easier to assemble because it is easier to dispose the inner ring in the bore of the outer ring.

Current designs of fractured spherical plain bearings typically use steel snap rings, bands, or plastic tie wraps located on an outside surface of the outer ring to maintain the outer ring in position during, for example, shipping and installation. In some current designs, one or more grooves are included on the outside surface of the outer ring. The grooves typically serve to maintain the snap rings, bands, or plastic tie wraps in position on the outside surface of the bearing. These additional grooves act as stress risers thereby promoting bearing failure under impact loads.

SUMMARY OF THE INVENTION

According to aspects illustrated herein, there is provided a spherical plain bearing. The bearing has an outer ring having a bore, a concave surface, and at least one fracture. The bearing further includes an inner ring having a convex surface. The convex surface is in sliding disposition with the concave surface when the inner ring is disposed in the bore. The bearing has a groove located in a face defined by the outer ring. A band is at least partially positioned in the groove in a manner that releasably retains the band in the groove when installed in the groove. The band is operable to inhibit the fracture surface from opening up once the inner ring is installed.

According to other aspects illustrated herein, there is provided a spherical plain bearing. The bearing has an outer ring having a bore and a concave surface. The outer ring comprises two or more sections separated by fractures. The bearing further has an inner ring having a convex surface. The convex surface is in sliding disposition with the concave surface when the inner ring is disposed in the bore. The bearing has a groove located in a face defined by the outer ring. A band is at least partially positioned in the groove in a manner that releasably retains the band in the groove when installed in the groove. The band is operable to inhibit the fracture surfaces from opening up once the inner ring is installed.

According to other aspects illustrated herein, there is provided a spherical plain bearing. The bearing has an outer ring having a bore defined by a concave peripheral surface and an inner ring have a convex outer surface. The convex outer surface is in sliding disposition with the concave surface when the inner ring is disposed in the bore. A band is at least partially positioned in the groove in a manner that releasably retains the band in the groove when installed in the groove. The band is operable to retain a releasably retain a seal to the bearing, the seal for inhibiting ingress of particulate into an area between the concave surface of the outer ring and the convex surface of the inner ring.

According to other aspects illustrated herein, there is provided a method of assembling a spherical plain bearing. The method includes the step of providing an outer ring having a bore and defining a concave inner surface, the outer ring having two or more sections separated by fractures. The method further includes the step of providing an inner ring defining a convex outer surface, the convex outer surface in sliding disposition with the concave inner surface when the inner ring is disposed in the bore. The method further includes the step of providing a groove in a face of the outer ring. Positioning a band at least partially in the groove in a manner that releasably retains the band in the groove when installed in the groove. The band is operable to inhibit the fracture surfaces from opening up once the inner ring is installed.

BRIEF DESCRIPTION OF THE DRAWINGS

FIG. 1 is a perspective exploded view of a spherical plain bearing

FIG. 2A is a cross-sectional view of a portion of the spherical plain bearing shown in FIG. 1.

FIG. 2B is a cross-sectional view of a portion of the spherical plain bearing shown in FIGS. 1 and 2A.

FIG. 3 is a cross-sectional view of a portion of a spherical plain bearing.

DETAILED DESCRIPTION OF THE INVENTION

Figure 4:
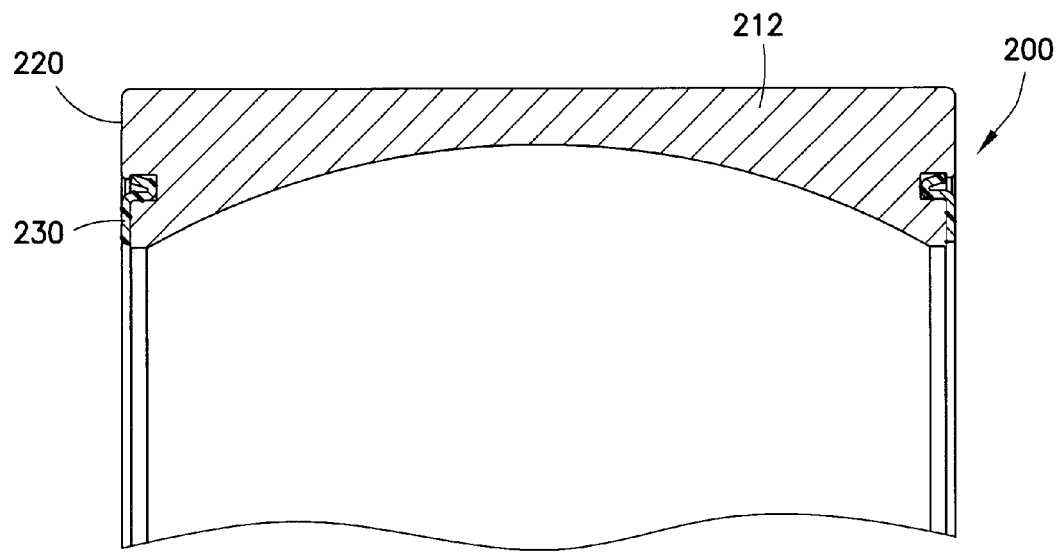
FIG. 4 is a cross-sectional view of a portion of a spherical plain bearing.

As shown in FIGS. 1-2B, a spherical plain bearing is generally identified by reference number 10. The term "bearing" may be used in this description to refer to the spherical plain bearing 10. The bearing 10 comprises an outer ring 12 and an inner ring 14. The outer ring 12 has a bore 22 having a first opening 23 and a second opening 25. While the illustrated embodiment shows an outer ring 12 having first and second bore openings 23, 25 the invention is not limited in this regard. For example, the present invention may be employed with an outer ring having a single bore opening, or, for example, it may be employed with an outer ring having two or more bore openings having different diameters, for example, in an angular contact spherical plain bearing.

The outer ring 12 has a concave surface 34. The inner ring 14 has a convex surface 36. The convex surface 36 is in sliding disposition with the concave surface 34 when the inner ring 14 is disposed in the bore 22 of the outer ring 12.

The outer ring 12 comprises two sections 16, 18. The first section 16 and the second section 18 each comprise approximately half of the outer ring 12. The first section 16 and the second section 18 are separated by a first fracture line 37 and a second fracture line 38. This may be referred to as a double fractured outer ring. During assembly of the bearing 10, the first section 16 and the second section 18 are brought together around inner ring 36 at the first fracture line 37 and second fracture line 38. This design facilitates assembly because the greatest outside diameter of the inner ring 14 is typically larger that the diameter of the first bore opening 23 or the second bore opening 25. While the illustrated embodiment shows an outer ring 12 having first and second sections 16, 18 the present invention is not limited in this regard. For example, the present invention may be employed with an outer ring comprising a single piece without any fractures, an outer ring comprising a single piece with a single fracture, or, with a outer ring comprising three or more sections.

The outer ring 12 has a first face 20. A portion of the outer ring 12 defines a groove 28 is in the first face 20 of the outer ring 12 radially outside the first opening 23 of the bore 22. In reference to FIG. 2A-2B, a portion of the outer ring 12 radially outside the groove 28 and extends radially inward defining a protrusion 21. Although the present disclosure is shown with the protrusion, the disclosure is not limited in this regard. The first face 20 of the outer ring 12, for example, may have a groove without a protrusion, or the outer ring may have a groove having multiple protrusions. The outer ring 12 further includes a counter bore 26 in the first face 20 of the outer ring 12. Although the embodiment illustrated in FIGS. 1-2B is shown with a counter bore 26, the bearing of the present disclosure is not limited in this regard, and may be employed with an outer ring not having a counter bore.

As shown in FIG. 2B, a band 30 is coupled to the first face 20 of the outer ring 12. The band 30 is ring shaped and has an outer portion 31 and an inner portion 32. The band 30 may be constructed from any suitable material, for example, rubber, cloth, metal, plastic, or the like. The band 30 is coupled to the outer ring 12 at least in part by friction between the band 30 and the outer ring 12. In addition, the outer portion 31 of the band 30 may exert a force on the portion of the outer ring 12 that defines the groove 28, thereby coupling the band 30 to the outer ring 12. It is noted that the description refers to the band as being coupled to the outer ring. This means that the band is fixed in relation to the outer ring. In some embodiments, the band is detachably coupled to the outer ring, meaning the band is fixed relative to the outer ring by some combination of friction and forces between the components, but without use of any other element. In some embodiments, the band is fixedly coupled to the outer ring, meaning that band is fixed relative to the outer ring by some additional element, other than friction and forces between the band and the outer ring. For example, the band is fixed relative to the outer ring by staking, welding, adhesive, or other known method. It should be understood that the term coupled, as used in this application, includes both detachably coupled and fixedly coupled.

The outer portion 31 of the band 30 is received in the groove 28. The outer portion 31 is folded in the groove 28. An outer edge of the outer portion 31 of the band 30 abuts the protrusion 21. The folded portion of the band 30 may serve in part to detachably couple the band 30 to the portion of the outer ring 12 defining the groove 28. Specifically, forces between the surface of the outer portion 31 of the band 30 and the portion of the outer ring 12 defining the groove 28 may serve in part to detachably couple the band 30 to the portion of the outer ring 12 defining the groove 28 The groove 28 has a first groove portion formed in the first outer ring section and a second groove portion formed in the second outer ring section; while the band coupled to the groove has a first band portion extending circumferentially around the first ring section from the first fracture to the second fracture, and a second band portion extending circumferentially around the second ring section from the second fracture to the first fracture. The first band portion engages the first groove portion in a first friction fit and imparts a first force circumferentially around the first ring section directed radially inwardly. The second band portion engages the second groove portion in a second friction fit and imparts a second force circumferentially around the second ring section directed radially inwardly. The first force and the second force cooperate to urge the first outer ring section and the second outer ring section together and retain the first outer ring section and the second outer ring section around the inner ring when the inner ring is disposed in the bore. While the illustrated embodiment shows the outer portion 31 of the band 30 being detachably coupled to portion of the outer ring 12 defining the groove 28, the present disclosure is not so limited. For example, the band 30 may be coupled by staking, welding, or adhesive.

Although not expressly disclosed in the figures, a second band may be detachably coupled to a second face of outer ring 12. It should be understood that the second band may be coupled in a manner similar to the first band 30 or in a manner different that the first band 30. By providing first and second bands on a spherical plain bearing having first and second bore openings, the retention forces created by the bands are typically symmetric, thus providing a more stable bearing arrangement for shipping and installation. The band 30 serves in part to retain the first section 16 and the second section 18 of the outer ring 12 around the inner ring 14 after the bearing 10 is assembled.

In reference to FIG. 2B, the band 30 may be used to couple a seal 44 to the bearing 10. In the embodiment shown in FIG. 2B, the seal 44 is received in the counter bore 26. The inner portion 32 of the band 30 extends into the counter bore 26 and, at least in part, couples the seal 44 to a portion of the outer ring 12 defining the counter bore 26. Additionally, the inner portion 32 of the band 30 applies a force on the seal 44 such that the seal 44 is urged against the convex surface 36 of the inner ring 14. In this manner, the seal 44 is positioned so as to inhibit ingress of particulate into an area between the concave surface 34 of the outer ring 12 and the convex surface 36 of the inner ring 14.

The use of the band 30 provides for easier seal installation and provides improved seal retention by allowing full seal face engagement and radial retention. In the illustrated embodiment, the band 30 couples the seal 44 to the bearing 10. The present disclosure is not limited in this regard. For example, various shaped seals and coupling methods may be used with the band in accordance with the present invention. Additionally, the outer ring may not include a counter bore and the seal may be coupled to the first face of the outer ring below the groove. In some embodiments, a seal is not included. It other embodiments, a seal is included, but the seal is not coupled to the bearing by any portion of the band.

The disclosed configuration provides for a maximum contact area between the contacting surfaces of the outer ring 12 and the inner ring 14 without interference from the retention band 30. Also, existing outer ring widths are maintained by incorporating the counter bore 26 in the front face 20 to account for the width of the retention band 30. Additionally, the incorporation of the retention band 30 into the groove 28 on the front face 20 of the outer ring 12 eliminates the need for snap ring grooves on the outside diameter of the bearing.

In reference to FIG. 3, a bearing 100 in accordance with one embodiment of the present invention is shown. The bearing 100 has an inner ring 114 having a convex surface 136 and an outer ring 112 having a concave surface 134. The convex surface 136 is in sliding disposition with the concave surface 134 when the inner ring 114 is disposed in a bore of the outer ring 112. The outer ring 112 has a first face 120. A groove 128 is in the first face 120 of the outer ring 112 radially outside a first opening of the bore. The outer ring 112 further defines a counter bore 126 in the first face 120 of the outer ring 112 extending along at least a portion of the perimeter of the first opening. A band 130 is coupled to the front face 120. The band 130 is ring shaped and has and outer edge 131 and an inner edge 132. The band 130 serves to, at least in part, couple a seal 144 to the bearing 110. The counter bore 126 defines a second groove 129 radially above the first opening of the bore and radially below the groove 128. An outer portion 145 of the seal 144 is received in the second groove 129.

Figure 5:
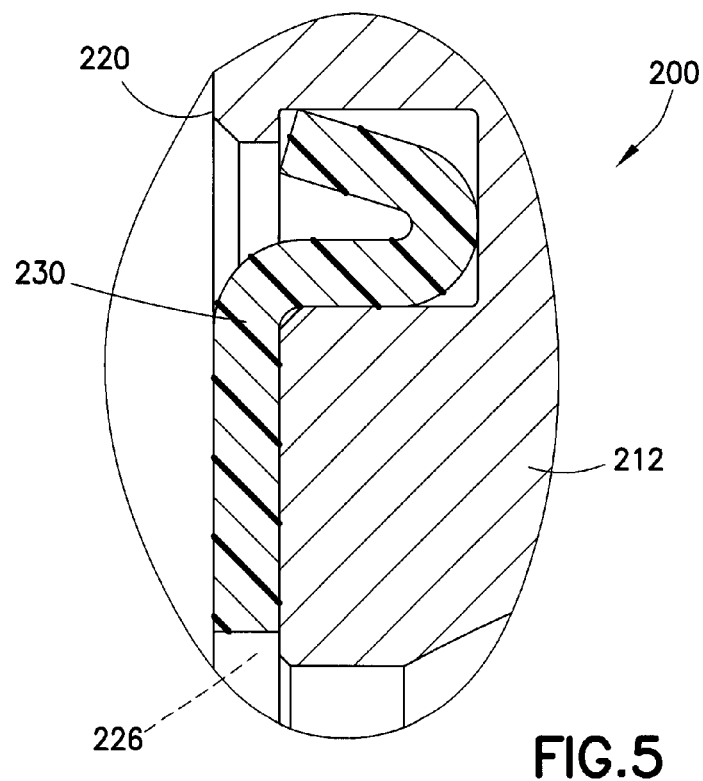
FIG. 5 is a cross-sectional view of a portion of the spherical plain bearing shown in FIG. 4.

A portion of a bearing 200 in accordance with one embodiment of the present invention is shown is shown in FIGS. 4-5. Attachment of a retention band 230 at the front face 220 of the outer ring 212 and the incorporation of the counter bore 226 provides for a substantially flush front (and back) face 220 of the bearing 200. The embodiment shown in FIGS. 4-5 does not include a seal member.

Although the present invention has been disclosed and described with reference to certain embodiments thereof, it should be noted that other variations and modifications may be made, and it is intended that the following claims cover the variations and modifications within the true scope of the invention.

What is claimed is:

1. A spherical plain bearing comprising:
   an outer ring having a bore, defined by a concave peripheral surface, and at least two fractures defining at least a first outer ring section and a second outer ring section;
   an inner ring having a convex outer surface, the convex outer surface being in sliding disposition with the concave peripheral surface when the inner ring is disposed in the bore;
   a groove in a face of the outer ring radially outside a first opening of the bore, the groove having a radially outward facing portion;
   a band coupled to a portion of the outer ring defining the groove, the band defining a continuous outer fold having a radially inward facing portion, the fold fixed within the groove by a friction fit between the radially inward facing portion of the fold and the radially outward facing portion of the groove, the friction fit configured to retain the first outer ring section and the second outer ring section around the inner ring when the inner ring is disposed in the bore.

2. The spherical plain bearing of claim 1, wherein the outer ring comprises more than two outer ring sections, wherein the outer ring sections are separated by fractures, and wherein the band retains the outer ring sections around the inner ring when the inner ring is disposed in the bore.

3. The spherical plain bearing of claim 2, further comprising the band cooperating with the groove to retain the fractures closed.

4. The spherical plain bearing of claim 1, further comprising:
   a counter bore in the face of the outer ring, wherein an inner portion of the band is disposed in the counter bore.

5. The spherical plain bearing of claim 4, further comprising:
   a seal for inhibiting ingress of particulate into an area between the concave surface of the outer ring and the convex surface of the inner ring, the seal being coupled to the outer ring, at least in part, by the band.

6. The spherical plain bearing of claim 5, wherein the inner portion of the band retains at least a portion of the seal in the counter bore.

7. The spherical plain bearing of claim 1, further comprising:
   a seal for inhibiting ingress of particulate into an area between the concave surface of the outer ring and the convex surface of the inner ring, the seal being coupled to the outer ring, at least in part, by the band.

8. The spherical plain bearing of claim 1, further comprising the band cooperating with the groove to retain the fractures closed.

9. The spherical plain bearing of claim 1:
   the groove having a first groove portion formed in the first outer ring section and a second groove portion formed in the second outer ring section;
   the continuous outer fold of the band having a first radially inward facing portion and a second radially inward facing portion;
   the first radially inward facing portion engages the first groove portion and imparts a first force circumferentially around the first ring section directed radially inwardly;
   the second radially inward facing portion engages the second groove and imparts a second force circumferentially around the second ring section directed radially inwardly; and
   the first force and the second force cooperate to urge the first outer ring section and the second outer ring section together and retain the first outer ring section and the second outer ring section around the inner ring when the inner ring is disposed in the bore.

10. A method of assembling a spherical plain bearing, comprising the steps of:
    providing an outer ring having a bore defined by a concave peripheral surface, the outer ring having two or more outer ring sections separated by fractures;
    providing an inner ring having a convex outer surface, the convex outer surface being in sliding disposition with the concave peripheral surface when the inner ring is disposed in the bore;
    providing a groove in a face of the outer ring radially outside a first opening of the bore, the groove having a radially outward facing portion;
    providing a band defining a continuous outer fold having a radially inward facing portion;
    disposing the inner ring in the bore by combining the two or more outer ring sections around the inner ring; and
    coupling a band to a portion of the outer ring defining the groove by fixing the fold in the groove by a friction fit between the radially inward facing portion of the fold and the radially outward facing portion of the groove to retain the two or more outer ring sections around the inner ring when the inner ring is disposed in the bore.

11. A spherical plain bearing comprising:
    an outer ring having a bore, defined by a concave peripheral surface, and a first fracture and a second fracture defining a first outer ring section and a second outer ring section;
    an inner ring having a convex outer surface, the convex outer surface being in sliding disposition with the concave peripheral surface when the inner ring is disposed in the bore;
    a groove in an axial face of the outer ring radially outside the bore, the groove having a first groove portion formed in the first outer ring section and a second groove portion formed in the second outer ring section;

a band coupled to the groove, the band having a first band portion extending circumferentially around the first ring section from the first fracture to the second fracture, and a second band portion extending circumferentially around the second ring section from the second fracture to the first fracture;

the first band portion engages the first groove portion in a first friction fit and imparts a first force circumferentially around the first ring section directed radially inwardly;

the second band portion engages the second groove portion in a second friction fit and imparts a second force circumferentially around the second ring section directed radially inwardly; and the first force and the second force cooperate to urge the first outer ring section and the second outer ring section together and retain the first outer ring section and the second outer ring section around the inner ring when the inner ring is disposed in the bore.

\* \* \* \* \*